United States Patent [19]
Busacker et al.

[11] Patent Number: 5,393,552
[45] Date of Patent: * Feb. 28, 1995

[54] PROCESS FOR PRODUCING FRENCH FRIES HAVING AN EXTENDED HOLDING QUALITY

[75] Inventors: William F. Busacker, Moses Lake; John W. Calder, Othello, both of Wash.; Linda J. Erickson, Newhall, Calif.; Richard K. Pinegar, Moses Lake, Wash.

[73] Assignee: Nestec S.A., Vevey, Switzerland

[*] Notice: The portion of the term of this patent subsequent to Apr. 12, 2011 has been disclaimed.

[21] Appl. No.: 225,112

[22] Filed: Apr. 8, 1994

Related U.S. Application Data

[63] Continuation-in-part of Ser. No. 89,470, Jul. 12, 1993, Pat. No. 5,302,410.

[51] Int. Cl.$^6$ ............................................. A23L 1/217
[52] U.S. Cl. ..................................... 426/637; 426/438; 426/441
[58] Field of Search ....................... 426/637, 438, 441

[56] References Cited

U.S. PATENT DOCUMENTS

| | | | |
|---|---|---|---|
| 3,424,591 | 1/1969 | Gold | 426/441 |
| 3,751,268 | 8/1973 | Van Patten et al. | 426/441 |
| 4,542,030 | 9/1985 | Haury et al. | 426/262 |
| 4,551,340 | 11/1985 | El-Hag et al. | 426/438 |
| 5,004,616 | 4/1991 | Shanbhag et al. | 426/438 |
| 5,059,435 | 10/1991 | Sloan et al. | 426/102 |
| 5,087,467 | 2/1992 | Schwank | 426/262 |
| 5,188,859 | 2/1993 | Lodge et al. | 426/637 X |
| 5,302,410 | 4/1994 | Calder et al. | 426/637 |

Primary Examiner—Arthur L. Corbin

[57] ABSTRACT

A process for preparing frozen potato strips which remain crisp for an extended period of time after finish frying. Potatoes which have been cut into strips and blanched are contacted with an aqueous solution having a pH in the range of about 5.5 to 8.5 which contains a hydrolyzed starch product, such as dextrin or maltodextrin. The pH of the aqueous solution is maintained within the desired range by the addition thereto of a basic alkali salt. A conventional chelating agent and reducing sugar may also be included in the aqueous solution. After contact with the aqueous solution, such as by immersion, spraying, and the like, the potato strips may be partially dried in hot air and are then frozen. The frozen potato strips are prepared for consumption by finish frying under suitable time-temperature conditions. Contacting the blanched potato strips with an aqueous solution containing a hydrolyzed starch product and having a pH in the range of 5.5–8.5 results in the production of potato strips which upon finish frying have a strong potato flavor and a crisp surface with the finish fried strips retaining their crispness for an extended period of time.

12 Claims, No Drawings

PROCESS FOR PRODUCING FRENCH FRIES HAVING AN EXTENDED HOLDING QUALITY

This application is a continuation-in-part of application Ser. No. 08/089,470, filed Jul. 12, 1993, now U.S. Pat. No. 5,302,410.

This invention relates to the production of frozen potato strips which, when finish fried for consumption, provide french fries having enhanced commercial holding quality. More particularly, the invention relates to a process for producing blanched frozen potato strips which remain crisp for longer periods of time after finish frying in comparison with conventionally prepared french fries.

BACKGROUND OF THE INVENTION

French fried potato strips, commonly referred to as french fries, served in most fast food restaurants and other food service institutions, are purchased by the restaurant in bulk from commercial suppliers in the form of partially fried (par-fried) and frozen potato strips which are stored in frozen condition until shortly before serving. At that point the par-fried potato strips are prepared for consumption by finish frying in fat or oil.

Procedures for producing such par-fried potato strips are well known in the processed potato industry. Typically, raw potatoes are cut into strips of desired size and blanched in steam or hot water to inactivate enzymes and partially cook the potatoes. The blanched strips usually are then dehydrated to reduce their weight (as water) by up to 30% and par-fried for 30 to 90 seconds at about 300°–400° F. (149°–204° C.), and then frozen. In a preferred commercial procedure the blanched strips, prior to dehydration, are immersed in a dilute aqueous solution containing a food grade sequestering agent, such as sodium acid pyrophosphate (SAPP) and a reducing sugar, such as dextrose or glucose. SAPP, present at a level of about 0.5% to 1.5%, minimizes product discoloration by chelating metal ions such as iron and copper present in the processing water. Dextrose or other reducing sugar in the aqueous solution facilitates uniform color development upon frying.

The use of frozen par-fried potato strips has been widely adopted in fast food restaurants because of the convenience and savings in labor costs they provide. However, par-fried potato strips presently available suffer from the disadvantage that when finish fried for consumption the french fries lose their desired crispness after a relatively short period of time and become undesirably limp and soggy. Thus, while the french fries are crisp immediately upon removal from the fryer, they become limp and soggy within minutes after preparation due to the migration of internal moisture within the fried strips into the outer surface of the fries. Such limpness of the french fries results in objectionable appearance, taste and texture and is a principal feature by which consumers identify a poor product.

Also, fast food restaurant operators maintain proper serving temperature by holding the french fries under a heat lamp after finish frying. However, this tends to accelerate moisture migration, so that the french fries tend to even more rapidly become limp, chewy and soggy.

Suppliers of frozen par-fried potato strips have proposed a number of solutions in order to improve the crispness of french fries after finish frying. For example, the surface treatment of potato strips with firming agents such as calcium lactate, gums, alginates, high amylose starches, and other hydrocolloids has been suggested. However, these and other proposed solutions neither fulfilled initial expectations nor have been widely accepted in the industry as a satisfactory solution to the problem.

As an alternative to the use of frozen par-fried potato strips, some restaurants and other food service institutions prefer to serve french fries prepared from potato strips which have not been subject to an intermediate par-frying step. For example, the french fries may be prepared from potato strips which are cut from whole potatoes on the premises of the restaurant, with the freshly cut potato strips being washed and finish fried for consumption. Such french fries are perceived to have a more desirable, "homemade" flavor than french fries prepared from par-fried potato strips. However, french fries prepared from potato strips which are finish fried for consumption promptly after being cut, rapidly develop a limp and soggy texture after finish frying, particularly when held under a heat lamp. Despite any flavor preference which may be provided by french fries prepared from freshly cut potato strips, the rapid development of such objectionable texture characteristics is a significant disadvantage.

SUMMARY OF THE INVENTION

The present invention provides a process for the production of frozen potato strips which, when finish fried for consumption, have enhanced commercial holding quality. That is, the potato strips of this invention, upon finish frying, have a crisp surface layer and a mealy inner core and retain their surface crispness and rigidity for a longer period of time after finish frying than conventional french fries.

In accordance with one embodiment of the present invention, raw potatoes are washed, cut into strips of a desired size and blanched in accordance with well-known procedures. Such procedures are exemplified in U.S. Pat. No. 4,254,153 to Ross et al. After blanching, the potato strips are contacted with an aqueous solution having a pH in the range of about 5.5 to 8.5 and which contains a hydrolyzed starch product, such as a dextrin or maltodextrin. The pH of the aqueous solution is adjusted to the desired range by any suitable means, such as the addition of an edible basic alkali salt, preferably tetrasodium pyrophosphate (TSPP). Conventional ingredients including a sequestering agent such as SAPP, and a reducing sugar such as dextrose, glucose, etc., may also be included in the aqueous solution. After contact with the aqueous solution, the strips may be partially dehydrated, after which they are par-fried and frozen. It has been found that contacting the potato strips with an aqueous solution containing a hydrolyzed starch and having a pH in the 5.5 to 8.5 range, after blanching and prior to dehydration and par-frying of the potato strips produces potato strips which remain crisp for longer periods than conventional french fries even when held under a heat lamp after finish frying. Thus, the frozen par-fried potato strips are finish fried in a deep fat or oil bath for a short period of time, such as 1.5 to 3.5 minutes at a temperature of about 300°–375° F. (149°–190° C.). The resulting french fries have a superior texture and color and are characterized by a crisp surface layer and mealy inner core. In addition, the french fries thus prepared retain their crispness and rigidity for longer periods of time after finish frying, without becoming limp, chewy and soggy.

In accordance with another embodiment of the invention, potato strips are frozen after contact with the aqueous hydrolyzed starch solution having a pH in the 5.5 to 8.5 range, without being par-fried. According to this embodiment, which is intended to produce french fries having a stronger potato flavor than french fries produced from potato strips which have been par-fried, the potato strips are blanched, contacted with the aqueous solution and frozen. Preferably the potato strips are partially dehydrated after contact with the aqueous solution and prior to freezing. The frozen potato strips thus produced are prepared for consumption by finish frying in a deep fat or oil bath for from about 4 to 6 minutes, preferably about 4.5 to 5.5 minutes at 300°–375° F. (149°–190° C.), depending on the cut size of the potato strips. The finish fried strips of this embodiment have the strong potato flavor of product prepared by finish frying of freshly cut potato strips, but retain desired crispness and rigidity for extended periods of time after finish frying.

DETAILED DESCRIPTION OF THE INVENTION

In the process of this invention, raw potatoes of a variety known to be suitable for preparing french fries, are washed, peeled and trimmed in accordance with conventional practice and are cut into strips of a desired size and shape customarily used for french fries such as shoestring potato strips, crinkle-cut strips, and straight cut thick strips. For example, the strips may have a width and thickness of from about 0.25 inch (6.35 mm) to about 0.5 inch (12.7 mm) and several inches (more than about 10 cm) in length. After cutting, the strips may be washed to remove surface starch.

The potato strips thus prepared are blanched according to conventional procedures in order to inactivate enzymes and remove excess free sugars from the surfaces of the cut strips. Typically the strips are blanched by immersion in hot water at about 160° F.–210° F. (71°–99° C.) for 2–15 minutes, with a temperature of 170° F.–190° F. (76°–88° C.) for 4–10 minutes being preferred. Alternatively, the strips may be blanched in steam, at atmospheric pressure for about 2–10 minutes.

It has been found that the crispness and rigidity of finish fried potato strips are improved by contacting the blanched strips, before par-frying, with an aqueous solution containing a hydrolyzed starch product, such as dextrin or maltodextrin, with the solution having a pH in the range of about 5.5 to 8.5 such as by the addition of an edible basic alkali salt. The inclusion of a hydrolyzed starch product such as dextrin and maltodextrin in the aqueous solution at a concentration of between about 1%–12% by weight, provides a thin coating or glaze on the potato strips which promotes increased crispness of the potato strips when finish fried. At such levels the hydrolyzed starch product is easily dispersed in water and forms a clear thin solution having a viscosity approximately the same as water. Higher levels may be used but are not preferred, since at higher concentrations the surface of the potato strips become slightly tacky upon finish frying which promotes undesirable clumping of the potato strips. Hydrolyzed starch products, including dextrins and maltodextrins, used in the aqueous solution have a Dextrose Equivalent (DE) value of from about 2 to about 10. The DE value is a measure of the reducing equivalence of the hydrolyzed starch product referenced to dextrose and expressed as a percent (dry basis). The higher the DE value, the more reducing sugars are present and the greater the amount of browning which occurs in frying. Hydrolyzed starch products having a DE value of higher than about 12 promote the production of unacceptably dark french fries upon finish frying. Preferably a maltodextrin such as corn maltodextrin and potato maltodextrin are used as the hydrolyzed starch product in the aqueous solution. Suitable maltodextrins include potato maltodextrins from Avebe America and corn maltodextrins from A.E. Staley Mfg. Co.

The aqueous solution with which the blanched potato strips are contacted has a pH in the range of between about 5.5 to 8.5, preferably between about 6.5 and 7.0. Contacting the blanched potato strips with the aqueous solution having a pH in this range results in a slight "sloughing" of the surfaces of the potato strips providing french fries exhibiting a substantial increase in crispness, rigidity and stand-up after finish frying. While the inclusion of a hydrolyzed starch product alone in the aqueous solution provides some increased crispness, adjusting the pH of the aqueous solution to the 5.5 to 8.5 range in combination with the hydrolyzed starch product provides an unexpectedly greater increase in crispness of the potato strips upon finish frying. The use of an aqueous solution having a pH above about 8.5 provides further increase in the crispness of the french fries but is generally not desirable since such a high pH results in unacceptable mottling, increased sloughing, and unacceptable flavor in the potato strips after finish frying.

The pH of the aqueous solution is adjusted to the 5.5 to 8.5 range by the addition of an edible basic alkali salt to the solution. Any basic alkali salt which is suitable for use in food products in the amount required to adjust the pH of the aqueous solution to the desired range may be used. Suitable basic alkali salts include alkali metal polyphosphates, such as tetrasodium pyrophosphate (TSPP), NaOH and the like. The use of TSPP as the basic alkali salt is generally preferred.

The amount of alkali salt included in the aqueous solution will, of course, depend on the specific alkali salt used, the particular pH desired, and other materials, if any, included in the solution, and can be readily determined by routine experimentation. For example, the use of 0.5% to 1.0% SAPP as a conventional chelating agent in the aqueous solution will provide the solution with a pH of about 5.0 to 5.3. The addition of TSPP (pH 9.2) to the aqueous solution in an amount of from 0.2% to 0.6% by weight will increase the pH of the aqueous solution to the desired range. When SAPP is included in the aqueous solution as a chelating agent and TSPP is added as the alkali salt, the pyrophosphate moiety, $P_2O_7$, in the aqueous solution preferably should not exceed about 1.5% by weight, for at higher levels undesirable off-flavors are developed in the french fries.

Any conventional chelating or sequestering agent and reducing sugar commonly used in treating blanched potato strips may be used in the aqueous solution of this invention. Thus, sodium acid pyrophosphate (SAPP) or other suitable and effective food grade chelating or sequestering agent may be included in the aqueous solution, in order to minimize product discoloration due to inorganic ions in the processing water. If SAPP is used, it is usually present in amounts of about 0.2% to 1.5% by weight. Similarly, a reducing sugar such as dextrose, glucose and the like may, if desired, also be included in the aqueous solution to facilitate uniform browning of the strips upon finish frying. If used, reducing sugar is present in the aqueous solution in amounts up to about 1.0% by weight.

The aqueous solution is maintained at a temperature of between about 130° F. to 180° F.(54° C.–71° C.) when contacted with the blanched potato strips. Preferably the blanched strips are immersed in the aqueous solution by passing the strips through a dip tank containing the aqueous solution for a period of time ranging from a few seconds to several minutes, preferably from about 10–60 seconds. However, other procedures such as spraying or contacting in a transfer trough may also be used.

After contact with the aqueous solution the potato strips are drained and preferably are then partially dehydrated to reduce their moisture content. Any of the conventional drying procedures used in the production of frozen par-fried potato strips may be used, such as, for example, subjecting the potato strips to heated air having a temperature of from about 100° F. to 350° F. (38° C. to 177° C.) for from about 2 to 20 minutes in order to reduce the moisture content of the strips to the point at which the strips have lost about 5% to 25% of their initial weight.

Thereafter, the partially dehydrated strips are par-fried by immersing them in a deep fat fryer for a short period of time, for example, 20 to 90 seconds at a fat temperature of about 325° F.–390° F.(162° C.–199° C.). Par-frying removes additional moisture from the strips so that upon completion of par-frying, the potato strips have a solids content of between about 30%–40%.

After par-frying, the potato strips are frozen, packaged and shipped or stored for subsequent use. To prepare the par-fried strips for consumption, they are finish fried in a deep fat or oil bath at a temperature of from about 300° F. to 375° F. (149° C. to 190° C.) for 1.5 to 3.5 minutes to develop color and crispness. The potato strips, after finish frying, have a crisp outer surface which is golden brown in color, a fluffy interior and increased holding quality or "stand-up" when compared to conventionally prepared french fries. The finish fried potato strips of this invention remain crisp for a longer period of time when held under a heat lamp after finish frying.

While the invention has been particularly described with respect to finish frying of the frozen par-fried potato strips, it will be understood that potato strips which have been processed in accordance with the present invention and par-fried may, if desired, be prepared for consumption by other conventional procedures such as, for example, oven baking and microwave heating.

If desired, the potato strips may be treated in accordance with the present invention and frozen without being par-fried. That is, potato strips are blanched and contacted with an aqueous solution containing a hydrolyzed starch product, such as dextrin or maltodextrin, having a DE value of less than about 12, and an edible basic alkali salt, such as TSPP, to provide the solution with a pH in the range of about 5.5 to 8.5, as described hereinabove. The concentration of hydrolyzed starch product in the aqueous solution may be from about 1% to 12% by weight. After contact with the aqueous solution the potato strips preferably are partially dehydrated to effect a weight loss of between 5% to 25%, after which the potato strips are frozen. To reconstitute the frozen strips for consumption they are finish fried in a deep fat or oil bath at a temperature of between 300° F. to 375° F. (149° C. to 190° C.). Since the frozen strips which have not been par-fried have a higher moisture content than par-fried strips, they are finished fried for a slightly longer period of time, typically 4 to 6 minutes, and preferably between about 4.5 to 5.5 minutes. The specific time-temperature conditions for finish frying the frozen strips are, of course, a function of the cut size of the potato strips, and can be readily determined by those skilled in the art. The resulting finish fried potato strips have a strong potato flavor comparable to french fries prepared form freshly cut potato strips, but retain crispness after finish frying for substantially longer periods than french fries prepared from freshly cut potatoes which have not been contacted with the aqueous solution of this invention.

The following examples are intended to illustrate, but not to limit, the present invention. Unless otherwise indicated, all parts and percentages are by weight.

EXAMPLE I

A random sample of Russet Burbank potatoes having an average solids content of 20.7% was washed, peeled, trimmed and cut into 5/16×5/16 inch (7.9×7.9 mm) strips and blanched in hot water at 180° F. (85° C.) for 8.5 minutes. After blanching, the potato strips were immersed for 40 seconds in an aqueous solution having a temperature of 160° F. (71° C.), with the aqueous solution containing the following ingredients:

| Ingredient | Weight Percent |
| --- | --- |
| Sodium Acid Pyrophosphate | 0.5% |
| Tetrasodium pyrophosphate | 0.5% |
| Potato maltodextrin (DE of 6) | 7.0% |

After removal from the aqueous solution the potato strips were drained and then partially dehydrated in a conventional air dryer at 212° (100° C.) for 15 minutes. The strips were then par-fried for 51 seconds at 370° F. (188° C.) and frozen. The par-fried strips were finish fried in hot oil at 350° F. (177° C.) for 2.75 minutes. Upon removal from the finish fryer the potato strips were golden brown in color, with a crisp outer surface and a fluffy interior. After finish frying, the potato strips were held under a standard heat lamp at a distance of 18 inches (46 cm) from the heat lamp for 5 minutes at which time the texture of the french fries was evaluated.

A control sample of french fries was run for comparison purposes. The control sample was processed in an identical manner as that set out above with the exception that the aqueous solution in which the blanched strips were immersed contained 0.5% SAPP and 0.3% dextrose, but no tetrasodium pyrophosphate or maltodextrin.

Both the control sample and the sample produced in accordance with the present invention were evaluated for color immediately after finish frying, and for crispness and stand-up after the finished fried strips had been held for 5–7 minutes under the heat lamp. Color was measured using an Agtron reflectance colorimeter in which a higher reading indicates a lighter color. Crispness and stand-up were determined subjectively by personnel experienced in evaluating french fry quality. The results of these determinations are set out below in the Table.

TABLE

| Sample | Color (Agtron Reading) | Evaluation Comments |
|---|---|---|
| Control | 66.9 | Acceptable crispness, tenderness |
| Invention | 63.3 | Shell more crispy than control sample; better "stand-up" under heat lamp than control |

EXAMPLE II

This example illustrates the improvement in crispness retention of french fries which are frozen without having been par-fried.

A random sample of Russett Burbank potatoes (specific gravity of 1.086) was washed, peeled, trimmed and cut into strips 5/16×5/16 inch (7.9×7.9 mm.) and water blanched for 9 minutes at 175° F. (80° C.). After blanching, the potato strips were dipped in an aqueous solution containing 0.4% sodium and pyrophosphate, 0.4% tetrasodium pyrophosphate, and 3.0% potato maltodextrin (DE of 6) for 40 seconds at 160° F. (71° C.). After removal from the aqueous solution the potato strips were drained and partially dehydrated in a conventional air drier at 100° C. for 5 minutes to effect a weight loss of 10%. The strips were then cooled with ambient moving air for 2 minutes and frozen for 10 minutes at −22° C.

To provide a basis for comparison, a control sample of french fries was produced in the identical manner as that set out above, with the sole exception that the aqueous solution in which the blanched strips were immersed contained 0.5% sodium acid pyrophosphate and 0.4% dextrose, but no tetrasodium pyrophosphate or maltodextrin.

Two pounds of both the french fries produced by the process of the present invention and the control sample were finish fried at 350° F. (177° C.) for 4.5 minutes, held under a heat lamp for 2 minutes, and were then evaluated for flavor and crispness. The control sample had a strong potato flavor but the french fried potato strips had very little crispness, with the strips tending to be limp and soggy, after the 2 minute hold under the heat lamp. The samples of the present invention also had a strong potato flavor and retained moderate crispness for 5 to 6 minutes after removal from the heat lamp. These results confirm that the process of this invention significantly increases the holding time of blanched frozen french fries which have not been par-fried.

What is claimed is:

1. A process for producing frozen potato strips which remain crisp for an extended time after finish frying which consists essentially of
   cutting potatoes to produce elongated potato strips,
   blanching the potato strips,
   contacting the blanched potato strips with an aqueous solution having a pH in the range of about 5.5 to 8.5 which contains between about 1% to 12% by weight of a hydrolyzed starch product having a DE value of less than 12, and then
   freezing the potato strips without the strips having been par-fried, whereby the frozen strips when finish fried have a crisp surface and a mealy internal texture, with the surface of the strips remaining crisp for an extended period of time after finish frying.

2. The process defined in claim 1 in which the hydrolyzed starch product is selected from the group consisting of dextrins and maltodextrins having a DE value of from 2 to 10.

3. The process defined in claim 2 in which the hydrolyzed starch product is potato maltodextrin.

4. The process defined in claim 1 in which a basic alkali salt is included in the aqueous solution in an amount sufficient to provide the aqueous solution with a pH in the range of about 5.5 to 8.5.

5. The process defined in claim 4 in which the basic alkali salt is selected from the group consisting of alkali metal polyphosphates.

6. The process defined in claim 4 in which the basic alkali salt is tetrasodium pyrophosphate.

7. The process defined in claim 1 in which the aqueous solution contains from 1% to 12% of maltodextrin, from 0% to 0.5% of a reducing sugar, from 0% to 1.5% of a sequestering agent and tetrasodium pyrophosphate in an amount sufficient to provide the aqueous solution with a pH of about 6.5 to 7.5.

8. The process defined in claim 7 in which the sequestering agent is sodium acid pyrophosphate and the tetrasodium pyrophosphate is present in an amount of from 0.2% to 0.6% by weight of the solution, with the total level of pyrophosphate moiety in the aqueous solution being not more than about 1.5% by weight.

9. The process defined in claim 1 in which the blanched potato strips are immersed in the aqueous solution, which is at a temperature of between about 130° F. to 180° F.(56° C. to 83° C.), for between 2 seconds to 3 minutes.

10. The process defined in claim 1 in which the potato strips are blanched in hot water at 160° F. to 210° F. (71° C. to 99° C.) for 2–15 minutes.

11. The process defined in claim 1 in which the strips are partially dehydrated after contact with the aqueous solution by contacting the potato strips with heated air having a temperature of about 100° F. to 350° F. (38° C. to 177° C.) for from 2 to 20 minutes.

12. A method of improving the crispness of french fried potato strips prepared by finish frying of blanched, frozen potato strips without the strips having been par-fried which consists essentially of
   contacting blanched potato strips with an aqueous solution having a pH in the range of about 5.5 to 8.5 which contains between about 1% to 12% by weight of a hydrolyzed starch product having a DE value of 2 to 10, and
   thereafter freezing the potato strips, whereby the frozen strips when finish fried have a crisp surface and a mealy internal texture, with the surface of the strips remaining crisp for an extended period of time after finish frying.

* * * * *